Sept. 19, 1950 P. P. ALEXANDER 2,522,592
PRODUCTION OF LITHIUM HYDRIDE
Filed Oct. 3, 1946
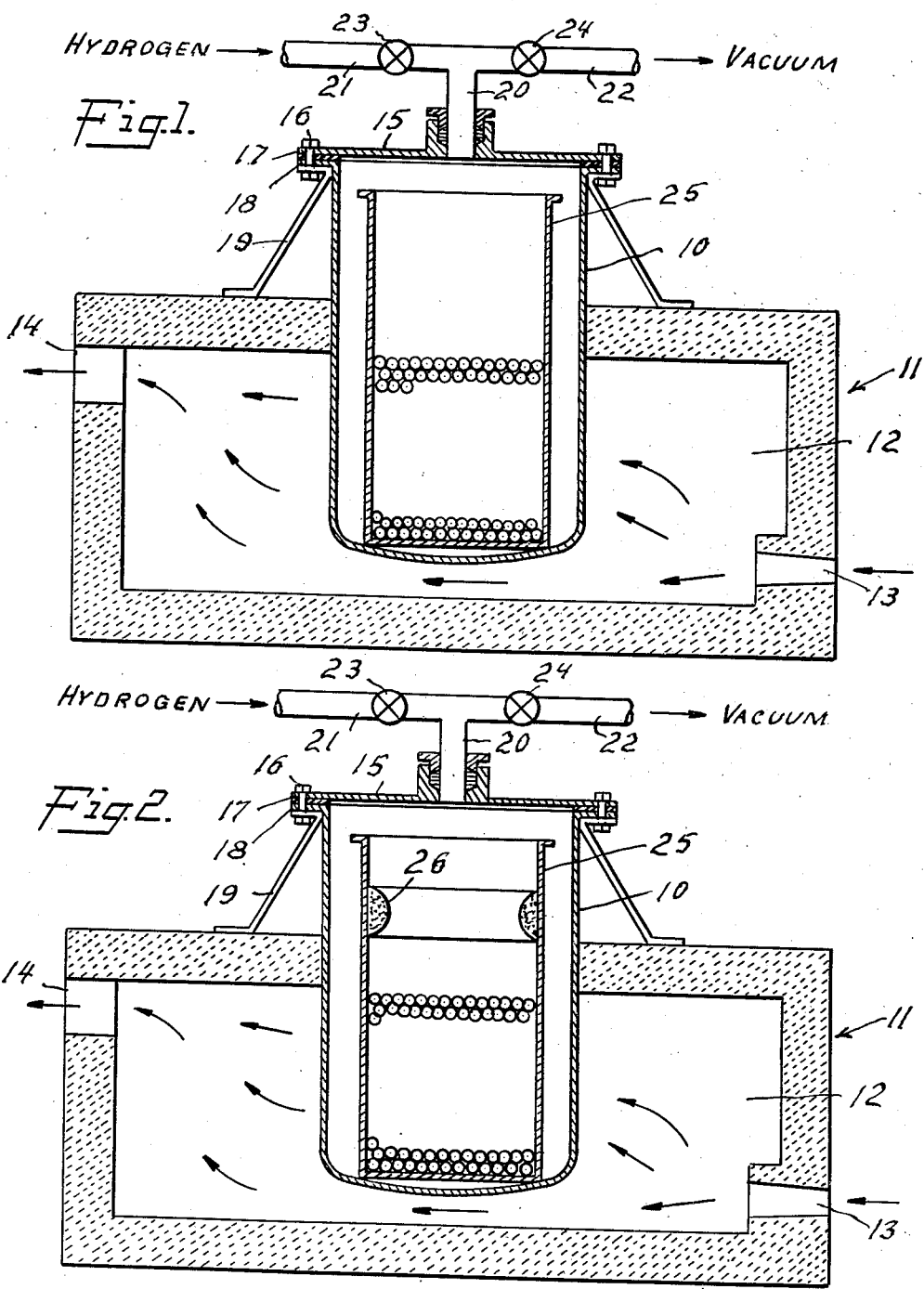
INVENTOR
PETER P. ALEXANDER
BY
ATTORNEYS Patented Sept. 19, 1950

2,522,592

UNITED STATES PATENT OFFICE 2,522,592

PRODUCTION OF LITHIUM HYDRIDE

Peter P. Alexander, Beverly, Mass., assignor to Metal Hydrides Incorporated, Beverly, Mass., a corporation of Massachusetts Application October 3, 1946, Serial No. 700,973

8 Claims. (Cl. 23—204)

This invention relates to the production of lithium hydride and has for its object certain improvements in the method of producing lithium hydride.

Lithium hydride is a highly desirable compound because of its great activity. It is particularly useful, for example, in the production of hydrogen gas when brought into contact with water:

$$LiH + H_2O \rightarrow H_2 + LiOH$$

A commercially satisfactory method of producing the lithium hydride has not heretofore been developed.

Such lithium hydride as has been made is generally obtained by passing hydrogen gas over heated metallic lithium produced electrolytically. Lithium produced by electrolysis has been quite expensive, so that this method of producing lithium hydride commercially has met with little favor.

As a result of my investigations, I have discovered relatively simple and inexpensive methods of producing lithium hydride. The necessary metallic lithium is obtained pyrometallurgically by the reduction of a lithium compound in a suitable reaction chamber and is preferably converted to the desired lithium hydride in the same chamber as part of the same operation.

The invention may be practiced in a number of different ways. In accordance with one method, a briquetted charge of finely divided lithium compound and reducing metal is confined in a reaction zone. The charge and reaction zone are advantageously placed under vacuum to remove objectionable air and moisture. Several procedures may then be followed.

In one procedure, for example, hydrogen gas is conducted into the reaction zone, preferably in amount to break the vacuum and to keep the reaction zone and charge under positive pressure. The charge is heated in the presence of the gas to a temperature sufficiently high to reduce the lithium compound and to convert the reduced lithium to lithium hydride but insufficiently high to volatilize the reduced lithium or to dissociate the lithium hydride. In such case, the newly formed lithium hydride remains admixed with the newly formed compound of the reducing metal and with any excess reducing metal in the charge residues.

In another procedure, the hydrogen gas is not conducted into the reaction zone directly after the air and moisture are evacuated. Instead, the charge is heated to a temperature sufficiently high to reduce the lithium compound and to distill the resulting metallic lithium while the reaction zone is still under vacuum. The distilled lithium is condensed in a cooler part of the reaction zone removed from the charge. Hydrogen gas is then admitted into the reaction zone and the condensed but still hot lithium is converted to lithium hydride. In such case, the distilled lithium is separated from the charge residues and condenses as high purity lithium which is converted to high purity lithium hydride during the hydriding step.

In accordance with another method, a loose charge of finely divided lithium compound and reducing metal is confined in a reaction zone. The charge and reaction zone are again advantageously placed under vacuum to remove air and moisture. The several procedures just described for a briquetted charge may then be employed in the treatment of the loose charge.

Various lithium compounds may be used in the practice of the invention, such as lithium oxide, lithium carbonate, lithium citrate, lithium silicate, etc. To this end, lithium ore concentrates may be employed. A particularly suitable source of lithium is lithium oxide.

Various reducing metals may be employed, such as aluminum, titanium, zirconium, silicon and silicon alloys, such as ferro-silicon. The reducing metal preferably has a high boiling point. These reducing metals have a higher boiling point than the lithium; they have a higher affinity for oxygen, for example; and they form stable non-volatile compounds, such as oxides. As a result, the reduced lithium may be selectively distilled, with no chance of becoming contaminated by the reducing metal or by its compound, or both.

The reactions that take place may be generally indicated as follows, when the reducing metal is aluminum:

$$3Li_2O + 2Al \rightarrow Al_2O_3 + 6Li$$

$$2Li + H_2 \rightarrow 2LiH$$

In accordance with the first procedure, the lithium oxide reacts with the aluminum in the presence of the hydrogen gas to form aluminum oxide and metallic lithium, the lithium being promptly converted to lithium hydride. The lithium hydride, like the aluminum oxide and excess aluminum, remains in the charge, the three ingredients being intimately admixed with one another whether the charge is briquetted or loose.

In accordance with the second procedure, the lithium oxide reacts with the aluminum to form aluminum oxide and metallic lithium. The charge is heated to a temperature sufficiently high to distill the reduced lithium. The reduction step is preferably conducted with the charge under high vacuum to facilitate distillation of the reduced lithium. The distilled lithium is condensed in a cooler zone removed from the charge. The aluminum oxide remains in the charge as a residue, as does any excess aluminum. Hydrogen gas is then brought in contact with the condensed and still hot lithium to convert it into lithium hydride. As in the other procedure, the charge may be briquetted or loose.

The mixture of lithium hydride and compound of the reducing metal (such as aluminum oxide, silicon oxide, etc., depending upon the reducing metal and lithium compound employed) is a highly satisfactory product for certain uses in the chemical industry. The main chemical action is the same as that of pure lithium hydride, for example, when reacting lithium hydride with water or moisture. From several points of view, however, the mixture is more suitable because it is more easily crushed and the individual particles are heavier than similar particles of pure lithium hydride, so that they will sink in oil, for example, whereas the pure lithium hydride particles will float on the surface.

These and other features of the invention will be better understood by referring to the accompanying drawing, taken in conjunction with the following description, in which—

Figure 1 is a diagrammatic representation of an apparatus usable in a practice of the invention to produce a mixture of lithium hydride and compound of the reducing metal employed; and Figure 2 is a similar representation illustrating the method of producing high purity lithium hydride.

The apparatus shown comprises an outer retort 10 suitably suspended within a furnace 11 having a heating chamber 12 with a conduit 13 near the bottom through which to introduce heating gases into the chamber, and a flue opening 14 near the top thereof through which to remove spent gases from the chamber. The retort is advantageously made of heat-resistant steel. It is provided with a removable cover 15, which may be bolted by a plurality of bolts 16 to a flange 18 extending circumferentially around the open end of the retort, a gasket 17 being disposed between the two to provide a non-leaking joint. The retort is suspended in the chamber by means of a plurality of spaced supports 19 extending between the flange and the top of the furnace.

The cover is provided with a pipe 20 connecting lateral branches 21 and 22 provided with valves 23 and 24, respectively. The first branch is connectible with a source of hydrogen gas, not shown; and the second branch is connectible to a source of vacuum, not shown.

An inner retort 25 fits within and is removable from the outer retort. As shown, both retorts extend above the heating chamber. This is not necessary when practicing the method illustrated by Figure 1 but is necessary when practicing the method illustrated by Figure 2, in which distilled lithium is condensed in a cooler zone removed from the charge.

In accordance with a practice of the invention to produce a mixture containing lithium hydride, as illustrated by Figure 1, inner retort 25 is partially filled with a briquetted or loose charge of intimately admixed finely divided particles of lithium oxide and metallic aluminum, for example. The aluminum is preferably present in excess of the amount theoretically required to reduce the lithium oxide. The retort is placed in outer retort 10, as shown. With gasket 17 in position, cover 15 is bolted to flange 18 to assure a sealed joint. With valve 23 closed, valve 24 is opened to place the retorts and charge under vacuum. Heating gases are passed through conduit 13 into heating chamber 12, so that the portion of outer retort 10 within the chamber particularly is elevated in temperature. Spent heating gases escape through flue opening 14. Evacuation of air moisture from the charge is facilitated as the temperature of the charge rises. Before the reduction reaction sets in, valve 24 is closed.

Valve 23 is then opened to admit hydrogen gas into the retorts. A sufficient amount of hydrogen gas is preferably introduced to break the vacuum and to place the charge under substantial positive pressure. If any leaks should occur in the system, hydrogen gas will tend to seep from the retorts, thus preventing outside air from seeping into the retorts. As further amounts of heating gases are passed through the heating chamber, the inner retort and its charge are indirectly heated to a temperature at which reduction sets in. The aluminum particles tend to melt around 658° C., thus assuring good contact with the lithium oxide particles. The heating of the charge is continued until the lithium oxide is reduced.

Due to the presence of the hydrogen gas, the reduced lithium is promptly converted to lithium hydride. If more hydrogen is required, additional amounts of the gas are introduced into the retorts. Since the lithium hydride is formed in situ, it is intimately admixed or associated with the resulting aluminum oxide and any excess aluminum that may be present in the charge. The temperature of the charge is kept below that at which the lithium volatilizes, 1336° C. Since the aluminum has an even higher boiling point, 1800° C., both the aluminum and lithium are retained in the charge. The end of the reaction is indicated when there is no further consumption of hydrogen gas. Valve 23 is closed and the system is permitted to cool to around room temperature, after which cover 15 is removed and inner retort 25 is withdrawn. The treated charge is suitably removed from the retort and is preferably crushed to a pulverulent form for subsequent use.

In accordance with a practice of the invention, to produce high purity lithium hydride, as illustrated by Figure 2, a similar briquetted or loose charge is placed in inner retort 25. Cover 15 is bolted onto flange 18, as before. With valve 23 closed, valve 24 is opened to evacuate the retorts and the charge, preferably as heating gases are passed through chamber 12. Before the charge reaches a temperature at which reduction sets in, valve 24 is closed. To facilitate operations, the retorts should be placed under very high vacuum. As the lithium oxide is reduced by the aluminum, the lithium is distilled and tends to rise upwardly in the inner retort. When the distilled lithium vapor reaches a cooler zone toward the top or open end of the retort, it is condensed on the wall of the retort, tending to form a ridge 26 of lithium metal. While a temperature must be reached at which the lithium distills, it is below the boiling points of the aluminum and aluminum oxide. Since the aluminum oxide does not distill and the excess aluminum remains behind, the lithium thus condensing on the retort wall is substantially pure. Valve 24 is closed. While the condensed lithium is still hot, valve 23 is opened and hydrogen gas is admitted to the retort. If additional heat is required to initiate the hydriding reaction, additional heating gases are passed through the heating chamber. Due to the concentration of high purity metallic lithium and the exothermic nature of the hydriding reaction, the hydrogen gas is preferably admitted slowly to prevent fusion of the lithium and dissociation of the newly formed lithium hydride. In due course the condensed lithium is entirely converted to lithium hydride. The retorts and their contents are permitted to cool, as before, after which cover 15 is removed and the lithium hydride is separately removed from the inner retort.

Since the reducing metal has a higher boiling point than the lithium, the charge is kept at a temperature below the boiling point of the reducing metal. It is preferable not to heat the charge to a temperature much above the boiling point of the lithium. This assures a minimum amount of wear and tear on the chamber or retort and makes easier the provision of a zone or portion of the chamber or retort in and on which the volatilized lithium may condense. Instead of condensing the lithium vapors in the retort, they may of course be conducted from the retort to a condenser. It is practical to condense the vapors in a cooler portion of the retort.

The reducing metals from group IV of the periodic table, such as silicon, titanium and zirconium, and from group III, such as aluminum, are especially suited for the purpose. Since aluminum has a melting point of only 658° C., it is comparatively easy to heat a charge containing it as a reducing metal to a temperature sufficiently high to melt the aluminum. Good contact can be obtained between the molten aluminum, which tends to be present in the charge as small globules, and the finely divided particles of lithium oxide, to assure their reduction. In the case of such reducing metals as silicon, titanium and zirconium, which have melting points of 1420°, 1800° and 1900° centigrade, respectively, it is impractical to heat the charge to a temperature at which they melt. Contact between the particles of such reducing metals and the particles of lithium oxide is therefore solid against solid. To assure optimum contact for reduction purposes, it is therefore necessary to briquet the charge. This may be accomplished, for example, by intimately admixing finely divided particles of the reducing metal and the lithium compound and then compressing relatively small quantities of the mixture into briquets with or without a suitable binder. For that reason, it is preferred not to use a loose charge when employing a reducing metal of unusually high melting point.

The retorts shown have a relatively small diameter to assure adequate transfer of heat from the heated retort wall to the center or core of the charge. This transfer of heat takes place by conduction, convection and radiation. Although the retorts are shown in a vertically disposed position, they may of course be placed horizontally, or even inclined at a suitable angle.

It will be clear to those skilled in this art that the above examples are only by way of illustration; that the practice of the invention readily lends itself to a number of useful modifications; and that the invention offers a relatively simple and inexpensive method of producing lithium hydride.

This application is a continuation in part of my copending application Serial No. 556,578, filed September 30, 1944, now Patent No. 2,408,748, dated October 8, 1946.

I claim:

1. In the method of producing lithium hydride, the improvement which comprises confining a charge of lithium compound and reducing metal in a reaction zone, heating the charge to a temperature sufficiently high to reduce the lithium compound and to distill the resulting metallic lithium, condensing the distilled lithium in a cooler zone removed from the charge, admitting hydrogen gas to the zone, and converting the condensed lithium by reaction with the hydrogen to lithium hydride, said reducing metal being substantially free of non-metallic elements in elemental form.

2. The method according to claim 1 in which the reducing metal is aluminum.

3. In the method of producing lithium hydride, the improvement which comprises confining a charge of lithium compound and reducing metal in a reaction zone, evacuating the reaction zone to remove air and moisture, heating the charge while under vacuum to a temperature sufficiently high to reduce the lithium compound and to distill the resulting metallic lithium, condensing the distilled lithium in a cooler zone removed from the charge, admitting hydrogen gas to the zone, and converting the condensed lithium by reaction with the hydrogen to lithium hydride, said reducing metal being substantially free of non-metallic elements in elemental form.

4. The method according to claim 3 in which the reducing metal is aluminum.

5. In the method of producing lithium hydride, the improvement which comprises confining a charge of lithium oxide and reducing metal in a reaction zone, heating the charge to a temperature sufficiently high to reduce the lithium oxide and to distill the resulting metallic lithium, condensing the distilled lithium in a cooler zone removed from the charge, admitting hydrogen gas to the zone, and converting the condensed lithium by reaction with the hydrogen to lithium hydride, said reducing metal being substantially free of non-metallic elements in elemental form.

6. The method according to claim 5 in which the reducing metal is aluminum.

7. In the method of producing lithium hydride, the improvement which comprises confining a charge of lithium oxide and reducing metal in a reaction zone, evacuating the reaction zone to remove air and moisture, heating the charge while under vacuum to a temperature sufficiently high to reduce the lithium oxide and to distill the resulting metallic lithium, condensing the distilled lithium in a cooler zone removed from the charge, admitting hydrogen gas to the zone, and converting the condensed lithium by reaction with the hydrogen to lithium hydride, said reducing metal being substantially free of non-metallic elements in elemental form.

8. The method according to claim 7 in which the reducing metal is aluminum.

PETER P. ALEXANDER.

REFERENCES CITED

The following references are of record in the file of this patent:

UNITED STATES PATENTS

| Number | Name | Date |
| --- | --- | --- |
| 1,019,581 | Zerning | Mar. 5, 1912 |
| 2,082,134 | Alexander | June 1, 1937 |
| 2,401,323 | Alexander | June 4, 1946 |
| 2,408,748 | Alexander | Oct. 8, 1946 |

OTHER REFERENCES

Mellor, "Treatise on Inorganic and Theoretical Chemistry," vol. 2, pp. 481-2, 1922, Longmans, Green & Co., London.